(12) United States Patent
Thyroff

(10) Patent No.: US 7,367,349 B2
(45) Date of Patent: May 6, 2008

(54) METHOD FOR OPENING TANK SHUT-OFF VALVES IN GAS FEEDING SYSTEMS WITH CONNECTED TANKS

(75) Inventor: Jurgen Thyroff, Harxheim (DE)

(73) Assignee: GM Global Technology Operations, Inc., Detroit, MI (US)

( * ) Notice: Subject to any disclaimer, the term of this patent is extended or adjusted under 35 U.S.C. 154(b) by 485 days.

(21) Appl. No.: 11/180,836

(22) Filed: Jul. 12, 2005

(65) Prior Publication Data
US 2007/0012362 A1    Jan. 18, 2007

(51) Int. Cl.
*G05D 7/06* (2006.01)
(52) U.S. Cl. .................. 137/14; 137/255; 137/488; 429/25
(58) Field of Classification Search .............. 137/14, 137/255, 488; 429/25, 13
See application file for complete search history.

(56) References Cited

U.S. PATENT DOCUMENTS

| 6,145,535 | A  | * | 11/2000 | Louchart, III | 137/14 |
| 6,371,145 | B1 | * | 4/2002  | Bardon        | 137/255 |
| 7,127,937 | B1 | * | 10/2006 | Thyroff       | 73/40.5 R |

* cited by examiner

*Primary Examiner*—Kevin Lee

(57) ABSTRACT

A method for opening tank shut-off valves in a fuel cell system that includes multiple pressurized tanks. A flow control device is positioned in a supply line downstream of the tank shut-off valves. When the system is started up, only one of the tank shut-off valves is opened to allow the pressure in the supply line to increase between the tank shut-off valves and the flow control device before the other tank shut-off valves are opened. Therefore, only one of the tank shut-off valves is subjected to the high pressure difference that induces significant valve wear and tear. The valve opening sequence is controlled so each of the tank shut-off valves is selected as the one to be opened at system start-up by a cycling process.

24 Claims, 2 Drawing Sheets

METHOD FOR OPENING TANK SHUT-OFF VALVES IN GAS FEEDING SYSTEMS WITH CONNECTED TANKS

BACKGROUND OF THE INVENTION

1. Field of the Invention

This invention relates generally to a method for selectively opening shut-off valves for multiple tanks in a gas feeding system to reduce valve wear and, more particularly, to a method for selectively opening shut-off valves for multiple tanks in a fuel cell system, where the method includes opening the shut-off valve associated with one tank until a pressure equalization occurs in a hydrogen supply line between the opened valve and a pressure drop device, and then opening the other shut-off valves for the other tanks thereafter to reduce valve wear.

2. Discussion of the Related Art

Hydrogen is a very attractive fuel because it is clean and can be used to efficiently produce electricity in a fuel cell. The automotive industry expends significant resources in the development of hydrogen fuel cell systems as a source of power for vehicles. Such vehicles would be more efficient and generate fewer emissions than today's vehicles employing internal combustion engines.

A hydrogen fuel cell is an electrochemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode. The work acts to operate the vehicle.

Many fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen in the air is consumed by the stack and some of the air is output as a cathode exhaust gas that may include water as a stack by-product. The fuel cell stack also receives an anode hydrogen input gas that flows into the anode side of the stack.

For some vehicle fuel cell designs, hydrogen is stored in compressed gas tanks under high pressure on the vehicle to provide the hydrogen necessary for the fuel cell system. The pressure in the compressed tank can be upwards of 700 bar. The compressed tank typically includes an inner plastic liner that provides a gas tight seal for the hydrogen, and an outer carbon fiber composite layer that provides the structural integrity of the tank. Because hydrogen is a very light and diffusive gas, the inner liner must be carefully engineered in order to act as a permeation barrier. The hydrogen is removed from the tank through a pipe. At least one pressure regulator is provided that reduces the pressure of the hydrogen within the tank to a pressure suitable for the fuel cell system.

Typically, the fuel cell systems discussed above include several compressed hydrogen tanks that are coupled to a common hydrogen supply line to the stack, where each tank includes a primary tank shut-off valve. A second shut-off valve or other flow control device is provided downstream of the tank shut-off valves, where the device can be a secondary shut-off valve, a flow restrictor, a pressure regulator, etc. The tank shut-off valves are designed to have a maximum number of cycles before the wear and tear of the valve components reduces the valves effectiveness, including sealing integrity against leaks. Typically, this maximum number of cycles is dependent upon the pressure difference between the inlet side of the valve and the outlet side of the valve when it is opened and closed. Particularly, if the pressure on the downstream side of the tank shut-off valve is much lower than the pressure in the tank during an opening cycle, the valve will wear out more quickly. It is desirable to limit the number of cycles of the tank shut-off valve at these pressure differences to increase the life of the valve.

SUMMARY OF THE INVENTION

In accordance with the teachings of the present invention, a method for selectively opening tank shut-off valves in a fuel cell system including multiple pressurized tanks is disclosed. A secondary shut-off valve or flow control device is positioned in a supply line downstream of the tank shut-off valves. When the system is started up, only one of the tank shut-off valves is opened to allow the pressure in the supply line to increase between the tank shut-off valves and the flow control device before the other tank shut-off valves are opened. Therefore, only one of the tank shut-off valves is subjected to the high pressure difference across the valve that induces significant valve wear and tear on the valve. The valve opening sequence is controlled so each of the tank shut-off valves is selected as the one to be opened first at system start-up by a valve opening cycling process.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for selectively opening compressed hydrogen tanks in a fuel cell system is merely exemplary in nature, and is in no way intended to limit the invention or its applications or uses. For example, the discussion below has particular application for opening compressed hydrogen tank shut-off valves in a fuel cell system. However, as will be appreciated by those skilled in the art, the system can have other applications beyond fuel cell systems.

Figure 1:
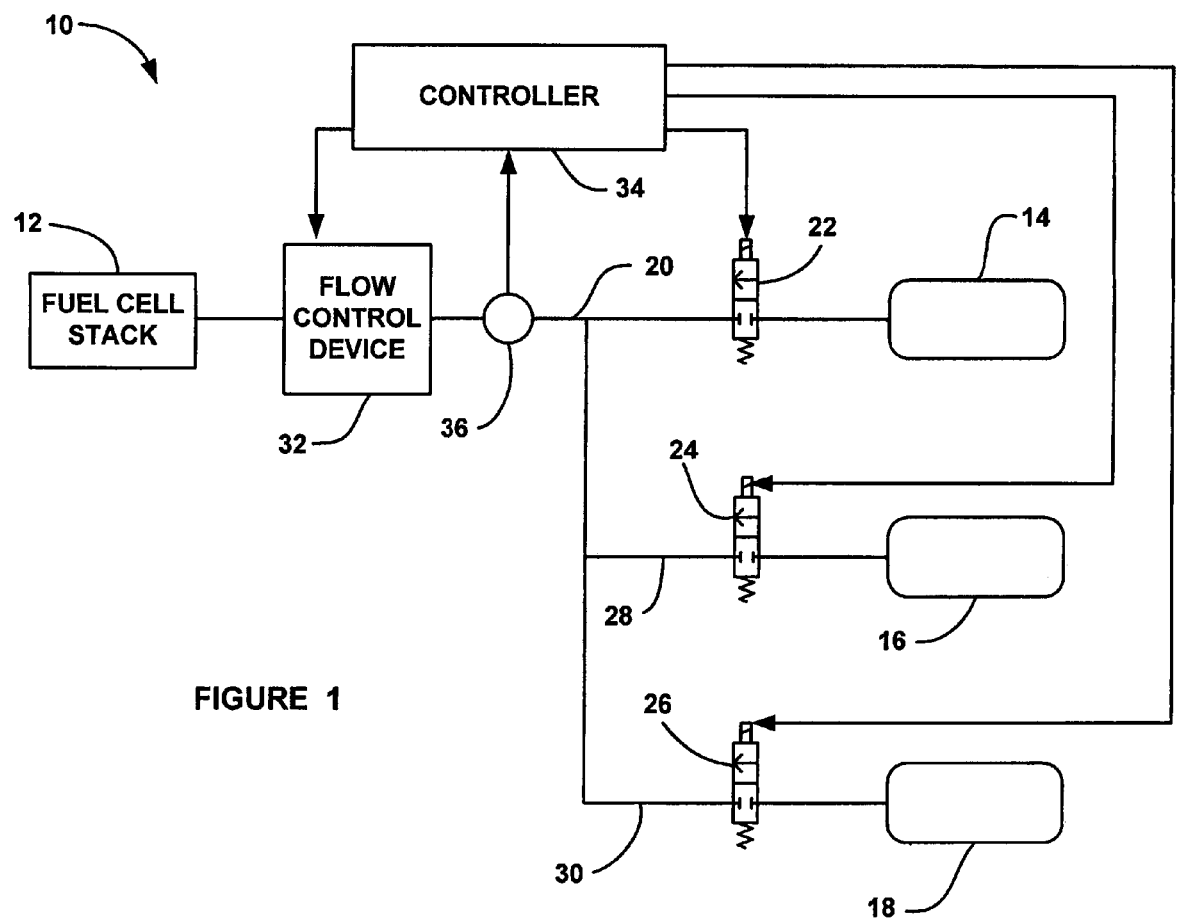
FIG. 1 is a plan view of a fuel cell system employing a method for selectively opening tank shut-off valves at system start-up to reduce valve wear and tear.

FIG. 1 is a plan view of a fuel cell system 10 including a fuel cell stack 12. The system 10 includes a plurality of high pressure hydrogen storage tanks 14, 16 and 18 that provide hydrogen gas to the stack 12 on a common supply line 20. In this embodiment, there are three tanks that store the hydrogen as a compressed gas. However, in other embodiments and applications, there may be fewer of the tanks or more of the tanks. Each of the tanks 14, 16 and 18 includes a primary tank shut-off valve 22, 24 and 26, respectively, positioned proximate the tank. In an alternate embodiment, the valves 22, 24 and 26 can be positioned within the tanks 14, 16 and 18, respectively. The shut-off valves 22, 24 and 26 can be any shut-off valve suitable for the purpose described herein, such as a flow control pressure regulator or an electromagnetically controlled valve. The tank shut-off valve 22 is positioned in the line 20, the tank shut-off valve 24 is positioned in a line 28 and the tank shut-off valve 26 is positioned in a line 30, where the lines 28 and 30 are coupled to the supply line 20.

A shut-off valve, flow control device or other pressure drop device 32 is provided in the supply line 20 downstream of the valves 22, 24 and 26. According to the invention, the device 32 can be any shut-off device or flow control device for a particular fuel cell system application, such as a secondary shut-off valve, a flow restrictor, a pressure regulator, etc., as long as the device 32 can allow a pressure build up between the device 32 and the valves 22, 24 and 26. A controller 34 controls the opening and closing of the valves 22,24 and 26 and the device 32 consistent with the discussion herein. A pressure sensor 36 can be provided in the supply line 20 between the valve 22 and the flow control device 32. The pressure sensor 36 provides a pressure measurement signal of the pressure within the supply line 20 to the controller 34.

According to the invention, the shut-off valves 22, 24 and 26 are sequentially opened at system start-up so that only one of the valves 22, 24 and 26 is opened against the large pressure drop that may exist between the tanks 14,16 and 18 and the stack 12 at each start-up. Once all of the valves 22, 24 and 26 are opened, then the flow control device 32 controls the pressure applied to the stack 12 from the supply line 20 until normal system operation is achieved.

Figure 2:
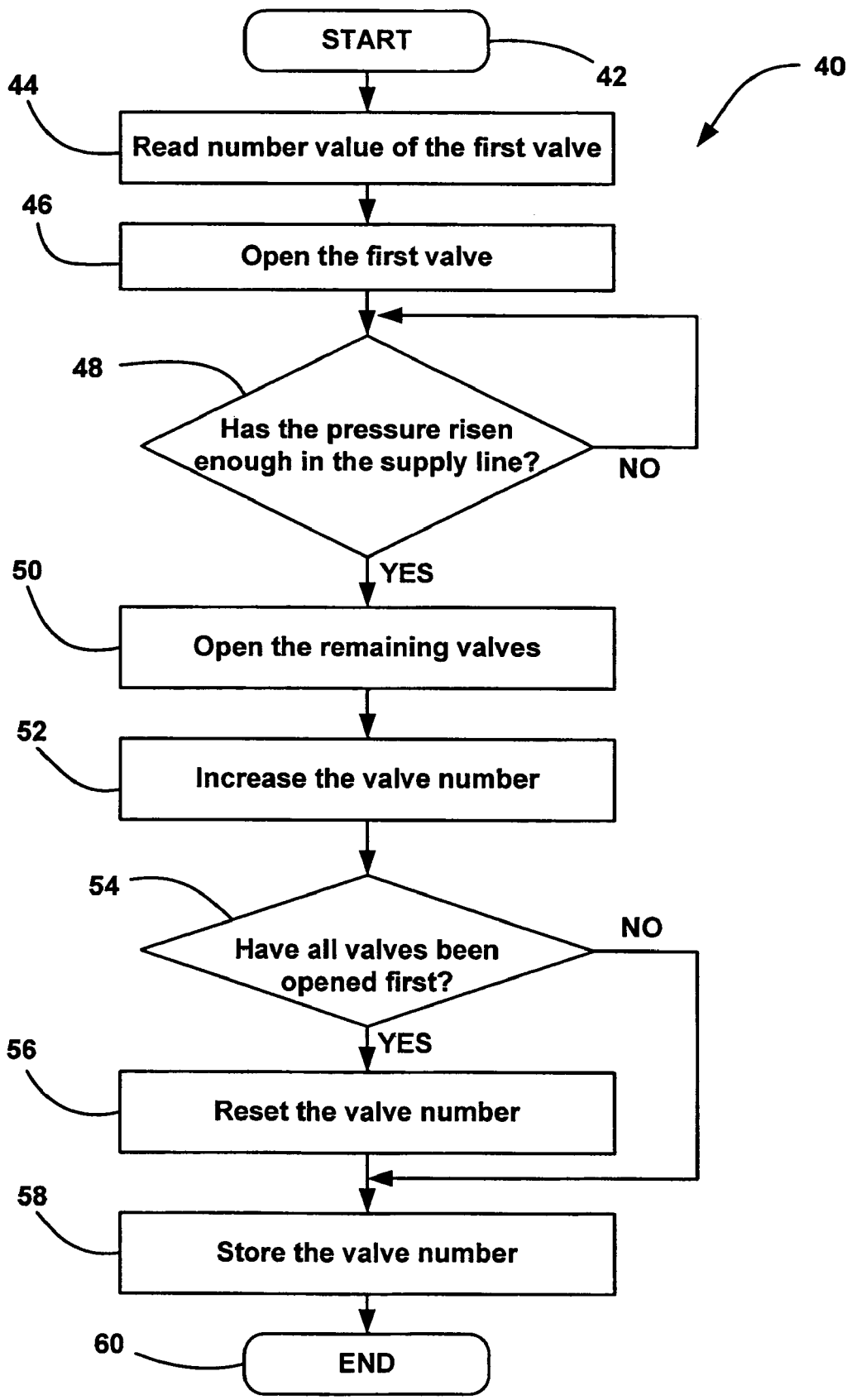
FIG. 2 is a flow chart diagram showing a process of the invention for selectively opening the tank shut-off valve at system start-up, according to an embodiment of the present invention.

FIG. 2 is a flow chart diagram 40 showing a process for sequentially opening the valves 22, 24 and 26 at system start-up. Each of the valves 22, 24 and 26 is given a different identification number that is stored in the controller 34. At system start-up, as indicated at box 42, the controller 34 reads the current stored identification number of the valves 22,24 or 26 at box 44. The controller 34 then opens the valve associated with the stored number at box 46. The controller 34 then monitors a predetermined time and/or the pressure measurement signal from the sensor 36 at decision diamond 48 to allow the pressure to rise in the supply line 20 between the just opened valve 22, 24 or 26 and the device 32. The predetermined time is based on a calibration that considers the volume of the lines 20, 28 and 30 and other factors to allow the pressure in the supply line 20 to reach a predetermined pressure. If the controller 34 uses the pressure measurement signal from the pressure sensor 36, then the controller 34 waits until the pressure in the supply line 20 reaches the predetermined pressure. In one embodiment, the predetermined pressure is about the same as the tank pressure, which will be known from tank pressure measurement signals.

Once the pressure has risen in the line 20 to the predetermined pressure between the shut-off valve 22, 24 or 26 and the device 32 at the decision diamond 48, the controller 34 opens the other valves 22, 24 or 26 that were not initially opened at box 50. The algorithm then increases or changes the valve identification number that is stored in the controller 34 at box 52 so that a different one or a next one of the valves 22,24 and 26 is opened first at the next start-up sequence. The controller 34 then determines if all of the valves 22,24 and 26 have been opened first at decision diamond 54. If all of the valves 22, 24 and 26 have been opened at least once, then the controller 34 resets the valve number to the original first valve number at box 56 and stores that valve number at box 58. Therefore, the process of the invention only allows one of the several shut-off valves that may be provided in a tank system associated with a fuel cell system at each start-up, where the other tank shut-off valves are opened against an equalized pressure on both sides of the valve.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for opening tank shut-off valves in a system including a plurality of compressed gas tanks, where each tank includes a shut-off valve, said method comprising:
   providing a pressure drop device downstream of the shut-off valves;
   determining which one of the plurality of tank shut-off valves will be opened first at a next start-up of the system;
   opening the determined valve at start-up to allow a pressure build-up in a supply line between the shut-off valves and the pressure drop device; and
   opening the remaining shut-off valves after the pressure in the supply line between the opened shut-off valve and the pressure drop device has reached a predetermined pressure.

2. The method according to claim 1 wherein opening the remaining shut-off valves includes waiting a certain period of time for the pressure in the supply line to reach the predetermined pressure.

3. The method according to claim 1 wherein opening the remaining shut-off valves includes measuring the pressure in the supply line to determine if the pressure in the supply line has reached the predetermined pressure.

4. The method according to claim 1 wherein determining which one of the plurality of tank shut-off valves will be opened first includes opening the shut-off valves by a predetermined sequence so that all of the shut-off valves are opened once before any of the shut-off valves are opened another time.

5. The method according to claim 1 wherein the predetermined pressure is about the same as the pressure in the tanks.

6. The method according to claim 1 wherein providing a pressure drop device includes providing a secondary shut-off valve.

7. The method according to claim 1 wherein providing a pressure drop device includes providing a flow restrictor.

8. The method according to claim 1 wherein providing a pressure drop device includes providing a pressure regulator.

9. The method according to claim 1 wherein the compressed gas tanks are compressed hydrogen gas tanks in a fuel cell system.

10. A method for opening tank shut-off valves in a fuel cell system including a plurality of compressed hydrogen gas tanks, where each tank includes a shut-off valve, said method comprising:
    providing a pressure drop device downstream of the shut-off valves;
    determining which one of the plurality of tank shut-off valves will be opened first at a next start-up of the system, wherein determining which one of the plurality of tank shut-off valves will be opened first includes opening the shut-off valves by a predetermined sequence so that all of the shut-off valves are opened once before any of the shut-off valves are opened another time;
opening the determined valve at start-up to allow a pressure build-up in a supply line between the shut-off valves and the pressure drop device; and
opening the remaining shut-off valves after the pressure in the supply line between the opened shut-off valve and the pressure drop device has reached a predetermined pressure.

11. The method according to claim 10 wherein opening the remaining shut-off valves includes waiting a certain period of time for the pressure in the supply line to reach the predetermined pressure.

12. The method according to claim 10 wherein opening the remaining shut-off valves includes measuring the pressure in the supply line to determine if the pressure in the supply line has reached the predetermined pressure.

13. The method according to claim 10 wherein the predetermined pressure is about the same as the pressure in the tanks.

14. The method according to claim 10 wherein providing a pressure drop device includes providing a secondary shut-off valve.

15. The method according to claim 10 wherein providing a pressure drop device includes providing a flow restrictor.

16. The method according to claim 10 wherein providing a pressure drop device includes providing a pressure regulator.

17. A fuel cell system comprising:
a plurality of compressed hydrogen tanks;
a tank shut-off valve for each tank;
a pressure drop device downstream of the shut-off valves; and
a controller for determining which one of the plurality of tank shut-off valves will be opened first at a next start-up of the system, said controller opening the determined valve at start-up to allow a pressure build-up in a supply line between the shut-off valves and the pressure drop device and then opening the remaining shut-off valves after the pressure in a supply line between the opened shut-off valve and the pressure drop device has reached a predetermined pressure.

18. The fuel cell system according to claim 17 wherein the controller opens the remaining shut-off valves after waiting a certain period of time for the pressure in the supply line to reach the predetermined pressure.

19. The fuel cell system according to claim 17 further comprising a pressure sensor for measuring the pressure within the supply line between the shut-off valves and the pressure drop device, wherein the controller opens the remaining shut-off valves when the measured pressure in the supply line has reached the predetermined pressure.

20. The fuel cell system according to claim 17 wherein the controller opens the shut-off valves by a predetermined sequence so that all of the shut-off valves are opened once before any of the shut-off valves are opened another time.

21. The fuel cell system according to claim 17 wherein the predetermined pressure is about the same as the pressure in the tanks.

22. The fuel cell system according to claim 17 wherein the pressure drop device is a secondary shut-off valve.

23. The fuel cell system according to claim 17 wherein the pressure drop device is a flow restrictor.

24. The fuel cell system according to claim 17 wherein the pressure drop device is a pressure regulator.

* * * * *